United States Patent
Zhou et al.

(10) Patent No.: US 10,803,184 B2
(45) Date of Patent: Oct. 13, 2020

(54) GENERATION OF A MODEL PARAMETER

(71) Applicant: Alibaba Group Holding Limited, George Town (KY)

(72) Inventors: Yashun Zhou, Hangzhou (CN); Lichun Li, Hangzhou (CN); Shan Yin, Hangzhou (CN); Huazhong Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/787,151

(22) Filed: Feb. 11, 2020

(65) Prior Publication Data
US 2020/0184081 A1 Jun. 11, 2020

Related U.S. Application Data

(63) Continuation of application No. PCT/CN2020/072084, filed on Jan. 14, 2020.

(30) Foreign Application Priority Data

Aug. 9, 2019 (CN) .......................... 2019 1 0734792

(51) Int. Cl.
*G06F 21/00* (2013.01)
*G06F 21/60* (2013.01)
(Continued)

(52) U.S. Cl.
CPC ............ *G06F 21/60* (2013.01); *G06N 20/00* (2019.01); *H04L 9/085* (2013.01); *G06F 17/16* (2013.01); *G06F 2221/2115* (2013.01)

(58) Field of Classification Search
None
See application file for complete search history.

(56) References Cited

U.S. PATENT DOCUMENTS

| 10,657,461 B2 * | 5/2020 | McMahan .............. G06F 17/16 |
| 2011/0060901 A1 | 3/2011 | Pastoriza et al. |

(Continued)

FOREIGN PATENT DOCUMENTS

| CN | 104168114 | 11/2014 |
| CN | 105071938 | 11/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Andrew J Steinle
(74) *Attorney, Agent, or Firm* — Fish & Richardson P.C.

(57) ABSTRACT

Implementations of the present specification provide method for determining a new model parameter for a data processing model. The method includes determining and receiving, from one or more other data parties, one or more other shares of a new model parameter. The one or more other shares of the new model parameter can be combined with a first share of the new model parameter determined by a first data party to produce a new model parameter. The new model parameter is used to train the data processing model.

20 Claims, 6 Drawing Sheets

(51) Int. Cl.
    *H04L 9/08*     (2006.01)
    *G06N 20/00*     (2019.01)
    *G06F 17/16*     (2006.01)

(56) References Cited

U.S. PATENT DOCUMENTS

| | | | |
|---|---|---|---|
| 2016/0119134 A1 | 4/2016 | Hakoda et al. | |
| 2018/0107926 A1* | 4/2018 | Choi | G06N 3/0472 |
| 2019/0138934 A1 | 5/2019 | Prakash et al. | |
| 2019/0245682 A1 | 8/2019 | Alwen | |

FOREIGN PATENT DOCUMENTS

| | | |
|---|---|---|
| CN | 105406966 | 3/2016 |
| CN | 108491266 | 9/2018 |
| CN | 109308418 | 2/2019 |
| CN | 109413087 | 3/2019 |
| CN | 109919318 | 6/2019 |
| CN | 109977694 | 7/2019 |
| CN | 110472439 | 11/2019 |
| CN | 110555315 | 12/2019 |
| CN | 110555525 | 12/2019 |
| CN | 110569227 | 12/2019 |
| CN | 110569228 | 12/2019 |
| CN | 110580409 | 12/2019 |
| CN | 110580410 | 12/2019 |
| WO | WO 2015103514 | 7/2015 |
| WO | WO 2019046651 | 3/2019 |
| WO | WO 2019072315 | 4/2019 |

OTHER PUBLICATIONS

Nakamoto, "Bitcoin: A Peer-to-Peer Electronic Cash System," www.bitcoin.org, 2005, 9 pages.
Bonawitz et al., "Practical Secure Aggregation for Privacy-Preserving Machine Learning", 2017 ACM SIGSAC Conference on Computer and Communications Security, Oct. 2017, 17 pages.
Chen et al., "Communication-Efficient Federated Deep Learning with Asynchronous Model update and Temporally Weighted Aggregation", Cornell University, Mar. 18, 2019, 10 pages.
Han et al., "Robust Federated Training via Collaborative Machine Teaching using Trusted Instances", King Abdullah University of Science and Technology, May 8, 2019, 16 pages.
PCT International Search Report and Written Opinion in International Application No. PCT/CN2020/072084, dated May 9, 2020, 17 pages (with machine translation).

* cited by examiner

GENERATION OF A MODEL PARAMETER

CROSS-REFERENCE TO RELATED APPLICATIONS

This application is a continuation of PCT Application No. PCT/CN2020/072084, filed on Jan. 14, 2020, which claims priority to Chinese Patent Application No. 201910734792.8, filed on Aug. 9, 2019, and each application is hereby incorporated by reference in its entirety.

TECHNICAL FIELD

Implementations of the present specification relate to the field of computer technologies, and in particular, to a model parameter determining method and apparatus and an electronic device.

BACKGROUND

In the big data era, there are many data islands. Data is usually distributed among different enterprises, and the enterprises do not trust each other completely for the sake of competition and privacy protection. In some cases, cooperative security modeling needs to be performed between the enterprises, so that a data processing model can be cooperatively trained by using data held by the enterprises while data privacy of the enterprises is fully protected.

SUMMARY

Implementations of the present specification are intended to provide a model parameter determining method and apparatus and an electronic device, so that a plurality of parties can cooperatively determine a model parameter of a data processing model on the basis of protecting data privacy.

To achieve the previous objective, one or more implementations of the present specification provide the following technical solutions:

According to a first aspect of the one or more implementations of the present specification, a model parameter determining method is provided, the method is applied to a first data party, and includes the following: secretly sharing a first product with a cooperator based on feature data and a share of a first model parameter, to obtain a share of the first product, where the first product is a product of the feature data and the first model parameter; secretly sharing a value of an activation function with the cooperator based on the share of the first product, to obtain a share of the value of the activation function; secretly sharing a gradient of a loss function and a Hessian matrix with the cooperator based on the feature data and the share of the value of the activation function, to obtain a share of the gradient of the loss function and a share of the Hessian matrix; secretly sharing a second product with the cooperator based on a share of a random orthogonal matrix and the share of the Hessian matrix, to obtain a share of the second product, where the second product is a product of the random orthogonal matrix and the Hessian matrix; secretly sharing a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and secretly sharing a new first model parameter with the cooperator based on the share of the first inverse matrix, the share of the gradient of the loss function, and the share of the first model parameter, to obtain a share of the new first model parameter.

According to a second aspect of the one or more implementations of the present specification, a model parameter determining method is provided, the method is applied to a second data party, and includes the following: secretly sharing a first product with a cooperator based on a share of a first model parameter, to obtain a share of the first product, where the first product is a product of feature data and the first model parameter; secretly sharing a value of an activation function with the cooperator based on the share of the first product, to obtain a share of the value of the activation function; secretly sharing a gradient of a loss function with the cooperator based on a label and the share of the value of the activation function, to obtain a share of the gradient of the loss function; and secretly sharing a Hessian matrix with the cooperator based on the share of the value of the activation function, to obtain a share of the Hessian matrix; secretly sharing a second product with the cooperator based on a share of a random orthogonal matrix and the share of the Hessian matrix, to obtain a share of the second product, where the second product is a product of the random orthogonal matrix and the Hessian matrix; secretly sharing a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and secretly sharing a new first model parameter with the cooperator based on the share of the first inverse matrix, the share of the gradient of the loss function, and the share of the first model parameter, to obtain a share of the new first model parameter.

According to a third aspect of the one or more implementations of the present specification, a model parameter determining apparatus is provided, the apparatus is applied to a first data party, and includes the following: a first secret sharing unit, configured to secretly share a first product with a cooperator based on feature data and a share of a first model parameter, to obtain a share of the first product, where the first product is a product of the feature data and the first model parameter; a second secret sharing unit, configured to secretly share a value of an activation function with the cooperator based on the share of the first product, to obtain a share of the value of the activation function; a third secret sharing unit, configured to secretly share a gradient of a loss function and a Hessian matrix with the cooperator based on the feature data and the share of the value of the activation function, to obtain a share of the gradient of the loss function and a share of the Hessian matrix; a fourth secret sharing unit, configured to secretly share a second product with the cooperator based on a share of a random orthogonal matrix and the share of the Hessian matrix, to obtain a share of the second product, where the second product is a product of the random orthogonal matrix and the Hessian matrix; a fifth secret sharing unit, configured to secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and a sixth secret sharing unit, configured to secretly share a new first model parameter with the cooperator based on the share of the first inverse matrix, the share of the gradient of the loss function, and the share of the first model parameter, to obtain a share of the new first model parameter.

According to a fourth aspect of the one or more implementations of the present specification, a model parameter determining apparatus is provided, the apparatus is applied to a first data party, and includes the following: a first secret sharing unit, configured to secretly share a first product with a cooperator based on a share of a first model parameter, to obtain a share of the first product, where the first product is a product of feature data and the first model parameter; a second secret sharing unit, configured to secretly share a value of an activation function with the cooperator based on the share of the first product, to obtain a share of the value of the activation function; a third secret sharing unit, configured to secretly share a gradient of a loss function and a Hessian matrix with the cooperator based on the share of the value of the activation function, to obtain a share of the gradient of the loss function and a share of the Hessian matrix; a fourth secret sharing unit, configured to secretly share a second product with the cooperator based on a share of a random orthogonal matrix and the share of the Hessian matrix, to obtain a share of the second product, where the second product is a product of the random orthogonal matrix and the Hessian matrix; a fifth secret sharing unit, configured to secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and a sixth secret sharing unit, configured to secretly share a new first model parameter with the cooperator based on the share of the first inverse matrix, the share of the gradient of the loss function, and the share of the first model parameter, to obtain a share of the new first model parameter.

According to a fifth aspect of the one or more implementations of the present specification, an electronic device is provided, and includes the following: a memory, configured to store a computer instruction; and a processor, configured to execute the computer instruction to implement the method steps according to the first aspect.

According to a sixth aspect of the one or more implementations of the present specification, an electronic device is provided, and includes the following: a memory, configured to store a computer instruction; and a processor, configured to execute the computer instruction to implement the method steps according to the second aspect.

It can be seen from the previous technical solutions provided in the implementations of the present specification that in the implementations of the present specification, the first data party and the second data party can cooperatively determine a model parameter of a data processing model by using a secret sharing algorithm without leaking data held by the first data party and the second data party. In addition, in the model parameter determining method in the implementations, a problem of non-convergence caused by an ill-conditioned matrix in the process of determining a model parameter by using a Newton's method can be avoided by using the condition number and the predetermined condition.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following description merely show some implementations of the present specification, and a person of ordinary skill in the art can further derive other drawings from these accompanying drawings without creative efforts.

DESCRIPTION OF IMPLEMENTATIONS

Figure 1:
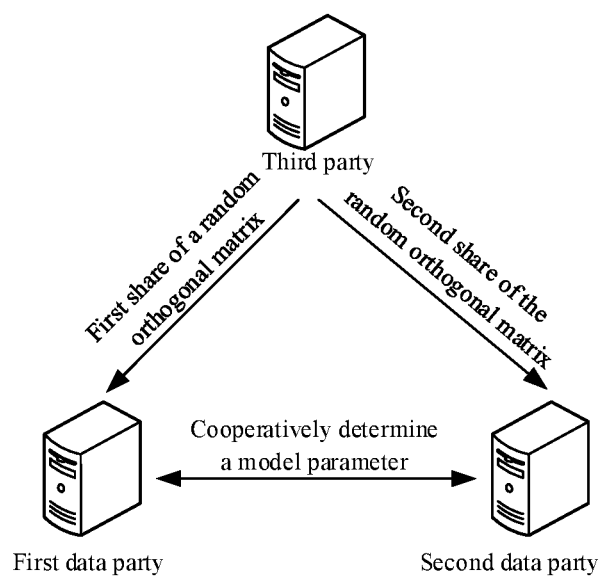
FIG. 1 is a schematic diagram illustrating a model parameter determining system, according to an implementation of the present specification.

The following clearly and comprehensively describes the technical solutions in the implementations of the present specification with reference to the accompanying drawings in the implementations of the present specification. The described implementations are merely some but not all of the implementations of the present specification. All other implementations obtained by a person of ordinary skill in the art based on the implementations of the present specification without creative efforts shall fall within the protection scope of the present specification.

Model parameter optimization methods can include a gradient descent method, a Newton's method, etc. The Newton's method can include an original Newton's method and many variations of the original Newton's method (for example, a damped Newton's method and a regularized Newton's method, where the regularized Newton's method is a Newton's method with a regularization term, and regularization can reduce the complexity and instability of a model, thereby reducing the risk of overfitting). The gradient descent method can include an original gradient descent method and many variations of the original gradient descent method (for example, a batch gradient descent method and a regularized gradient descent method, where the regularized gradient descent method is a gradient descent method with a regularization term, and regularization can reduce the complexity and instability of a model, thereby reducing the risk of overfitting).

The Newton's method has a higher rate of convergence than the gradient descent method. To reduce the number of times a model parameter is optimized and adjusted and improve training efficiency of a data processing model, parties for cooperative modeling preferentially cooperatively determine a model parameter of the data processing model by using the Newton's method. However, in some cases (for example, the proportion of positive samples to negative samples is unbalanced), an ill-conditioned matrix tends to occur in a process of determining a model parameter by using the Newton's method, and consequently the model parameter does not converge. A problem of non-convergence caused by an ill-conditioned matrix in the process of determining a model parameter by using the Newton's method can be avoided if an ill-condition degree of a Hessian matrix is determined in the process of determining a model parameter by using the Newton's method. In addition, if an ill-conditioned matrix appears in the process of determining a model parameter by using the Newton's method, the gradient descent method instead of the Newton's method can be further used to continue optimizing and adjusting a model parameter, to continue training the data processing model, thereby implementing adaptive selection of the Newton's method or the gradient descent method to optimize and adjust a model parameter.

The ill-conditioned matrix is a special matrix, and refers to a non-singular matrix with a relatively large condition number. An inverse matrix of the ill-conditioned matrix and a solution of a system of equations in which the ill-conditioned matrix is used as a coefficient matrix are very sensitive to a slight perturbation, which brings great difficulty to numerical solution.

A condition number of a matrix can be used to measure an ill-condition degree of the matrix. A larger condition number of the matrix indicates a higher ill-condition degree of the matrix, and a smaller condition number of the matrix indicates a lower ill-condition degree of the matrix. The condition number of the matrix is equal to a product of a norm of the matrix and a norm of an inverse of the matrix. For example, $cond(F)=\|F\|\times\|F^{-1}\|$, where $cond(F)$ represents a condition number of matrix F, $\| \|$ represents a norm operation, and $F^{-1}$ represents an inverse matrix of matrix F.

Secret sharing (SS) is an algorithm for protecting data privacy security. A plurality of data parties can perform cooperative calculation by using a secret sharing algorithm without leaking data held by the plurality of data parties, to obtain secret information. Each data party can obtain a share of the secret information. A single data party cannot restore the secret information. The secret information can be restored only when the plurality of data parties cooperate with each other. For example, data party $P_1$ holds data $x_1$, and data party $P_2$ holds data $x_2$. Data party $P_1$ and data party $P_2$ can perform cooperative calculation by using the secret sharing algorithm, to obtain secret information $y=y_1+y_2=x_1x_2$. Data party $P_1$ can obtain share $y_1$ of secret information y after calculation, and data party $P_2$ can obtain share $y_2$ of secret information y after calculation.

In a cooperative security modeling scenario, to protect data privacy, a plurality of data parties can cooperatively train a data processing model based on data held by the plurality of data parties without leaking the data held by the plurality of data parties. The data processing model includes but is not limited to a logistic regression model, a neural network model, etc. In a process of training the data processing model, a model parameter of the data processing model can be optimized and adjusted by using a model parameter optimization method. In the cooperative security modeling scenario, data used to train the data processing model is distributed among the data parties for cooperative modeling. Therefore, in the cooperative security modeling scenario, the model parameter optimization method can be implemented by using the secret sharing algorithm.

A loss function can be used to measure a degree of inconsistency between a predicted value and an actual value of a data processing model. A smaller value of the loss function indicates higher robustness of the data processing model. The loss function includes but is not limited to a logarithmic loss function, a square loss function, etc.

A Hessian matrix is a square matrix including a second-order partial derivative of a loss function, and is used to represent local curvature of the loss function.

An activation function can be used to construct a data processing model. The activation function defines an output for a given input. A non-linear factor can be added to the data processing model by using the activation function, to improve a representation capability of the data processing model. The activation function can include, for example, a Sigmoid function, a Tan h function, and a ReLU function, etc.

The present specification provides an implementation of a model parameter determining system.

Referring to FIG. 1, in the present implementation, the model parameter determining system can include a first data party, a second data party, and a trusted third party (TTP).

The third party can be a server, or can be a server cluster including a plurality of servers. The third party can provide a random number for the first data party and the second data party. The third party can generate a random orthogonal matrix, and divide each random number in the random orthogonal matrix into two shares: a first share and a second share. The third party can use a matrix including first shares of all the random numbers in the random orthogonal matrix as a first share of the random orthogonal matrix, and use a matrix including second shares of all the random numbers in the random orthogonal matrix as a second share of the random orthogonal matrix; and can send the first share of the random orthogonal matrix to the first data party, and send the second share of the random orthogonal matrix to the second data party. The sum of the first share of the random orthogonal matrix and the second share of the random orthogonal matrix is equal to the random orthogonal matrix. In addition, the random orthogonal matrix can be a random number matrix including a random number, or the random orthogonal matrix can be an orthogonal matrix. A new matrix can be obtained after a square matrix is multiplied by an orthogonal matrix, and the new matrix has the same condition number as the square matrix. As such, the first data party and the second data party can obtain a condition number of a Hessian matrix through cooperative calculation without leaking shares of the Hessian matrix that are held by the first data party and the second data party, and then can measure an ill-condition degree of the Hessian matrix based on the condition number. For a detailed process, references can be made to the following implementations.

The first data party and the second data party are parties for cooperative security modeling. The first data party can be a data party that holds no label, and the second data party can be a data party that holds a label. For example, the first data party can hold complete feature data, and the second data party can hold a label of the feature data. Alternatively, the first data party can hold a part of feature data, and the second data party can hold the other part and a label of the feature data. For example, the feature data can include a savings amount and a loan amount of a user. The first data party can hold the savings amount of the user, and the second data party can hold the loan amount of the user and a label of the feature data. The label can be used to distinguish between different types of feature data, and can have a specific value of, for example, 0 or 1. The data party here can be an electronic device. The electronic device can include a personal computer, a server, a handheld device, a portable device, a flat panel device, or a multi-processor apparatus. Alternatively, the electronic device can include a cluster including any number of apparatuses or devices described above, etc. In addition, the feature data and the label corresponding to the feature data constitute sample data, and the sample data can be used to train a data processing model.

In a cooperative security modeling scenario, each of the first data party and the second data party can obtain a share of a first model parameter. Here, a share obtained by the first data party can be used as a first share of the first model parameter, and a share obtained by the second data party can be used as a second share of the first model parameter. The sum of the first share of the first model parameter and the second share of the first model parameter is equal to the first model parameter.

The first data party can receive the first share of the random orthogonal matrix. The second data party can receive the second share of the random orthogonal matrix. As such, the first data party can cooperatively determine a new first model parameter in a secret sharing way based on the first share of the first model parameter, the feature data, and the first share of the random orthogonal matrix; and the second data party can cooperatively determine the new first model parameter in the secret sharing way based on the second share of the first model parameter, the label, and the second share of the random orthogonal matrix. Each of the first data party and the second data party can obtain a share of the new first model parameter. For a detailed process, references can be made to the following implementation of a model parameter determining method.

The present specification further provides an implementation of a model parameter determining method.

Figure 2:
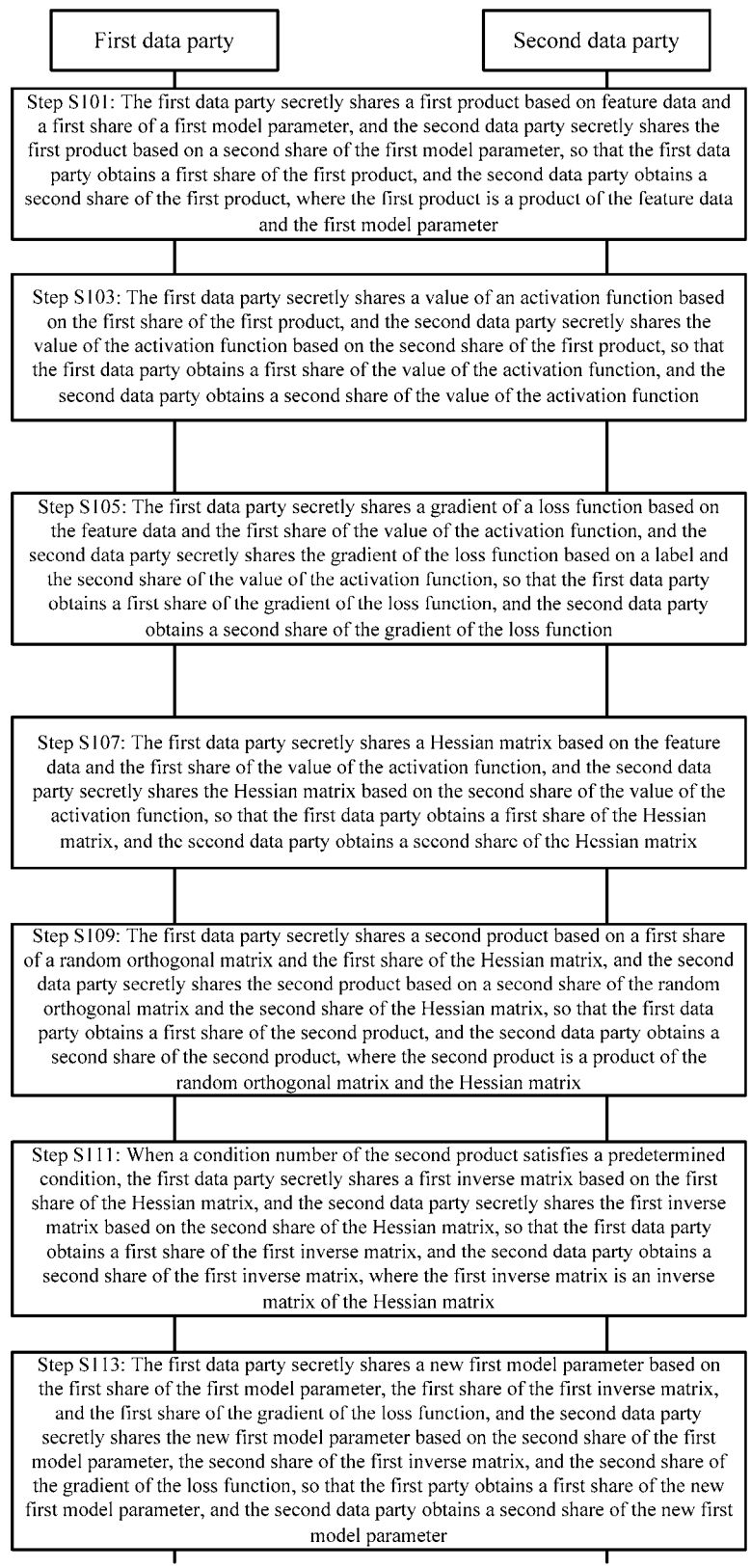
FIG. 2 is a flowchart illustrating a model parameter determining method, according to an implementation of the present specification.

Referring to FIG. 2, the present implementation can include the following steps.

Step S101: A first data party secretly shares a first product based on feature data and a first share of a first model parameter, and a second data party secretly shares the first product based on a second share of the first model parameter, so that the first data party obtains a first share of the first product, and the second data party obtains a second share of the first product, where the first product is a product of the feature data and the first model parameter.

Step S103: The first data party secretly shares a value of an activation function based on the first share of the first product, and the second data party secretly shares the value of the activation function based on the second share of the first product, so that the first data party obtains a first share of the value of the activation function, and the second data party obtains a second share of the value of the activation function.

Step S105: The first data party secretly shares a gradient of a loss function based on the feature data and the first share of the value of the activation function, and the second data party secretly shares the gradient of the loss function based on a label and the second share of the value of the activation function, so that the first data party obtains a first share of the gradient of the loss function, and the second data party obtains a second share of the gradient of the loss function.

Step S107: The first data party secretly shares a Hessian matrix based on the feature data and the first share of the value of the activation function, and the second data party secretly shares the Hessian matrix based on the second share of the value of the activation function, so that the first data party obtains a first share of the Hessian matrix, and the second data party obtains a second share of the Hessian matrix.

Step S109: The first data party secretly shares a second product based on a first share of a random orthogonal matrix and the first share of the Hessian matrix, and the second data party secretly shares the second product based on a second share of the random orthogonal matrix and the second share of the Hessian matrix, so that the first data party obtains a first share of the second product, and the second data party obtains a second share of the second product, where the second product is a product of the random orthogonal matrix and the Hessian matrix.

Step S111: When a condition number of the second product satisfies a predetermined condition, the first data party secretly shares a first inverse matrix based on the first share of the Hessian matrix, and the second data party secretly shares the first inverse matrix based on the second share of the Hessian matrix, so that the first data party obtains a first share of the first inverse matrix, and the second data party obtains a second share of the first inverse matrix, where the first inverse matrix is an inverse matrix of the Hessian matrix.

Step S113: The first data party secretly shares a new first model parameter based on the first share of the first model parameter, the first share of the first inverse matrix, and the first share of the gradient of the loss function, and the second data party secretly shares the new model parameter based on the second share of the first model parameter, the second share of the first inverse matrix, and the second share of the gradient of the loss function, so that the first data party obtains a first share of the new first model parameter, and the second data party obtains a second share of the new first model parameter.

The following describes some terms used in the implementations.

(1) A first product, a second product, a third product, a fourth product, and a fifth product. The first product can be a product of a first model parameter and feature data. The second product can be a product of a random orthogonal matrix and a Hessian matrix. The second product can also be referred to as a second product. The third product can be a product of an inverse matrix of the Hessian matrix and a gradient of a loss function. The fourth product can be a product of a first share of the gradient of the loss function and a predetermined step size. The fifth product can be a product of a second share of the gradient of the loss function and the predetermined step size.

In some scenario examples, the first product can be represented as XW, where W represents the first model parameter, and is a vector including the first model parameter, and X represents the feature data, and is a matrix including the feature data.

The second product can be represented as HR, where H represents the Hessian matrix, and R represents the random orthogonal matrix.

The third product can be represented as $H^{-1}dW$, where $H^{-1}$ represents the inverse matrix of the Hessian matrix, dW represents the gradient of the loss function, and dW is a vector.

The fourth product can be represented as $G<dW>_0$, and the fifth product can be represented as $G<dW>_1$, where G represents the predetermined step size, $<dW>_0$ represents the first share of the gradient of the loss function, $<dW>_1$ represents the second share of the gradient of the loss function, and $<dW>_0 + <dW>_1 = dW$.

(2) A first inverse matrix and a second inverse matrix. The Hessian matrix is a square matrix, and therefore inversion processing can be performed on the Hessian matrix, and an inverse matrix of the Hessian matrix can be used as the first inverse matrix. The second product can be a square matrix, and therefore inversion processing can be performed on the second product, and an inverse matrix of the second product can be used as the second inverse matrix.

Continuing with the previous scenario example, the first inverse matrix can be represented as $H^{-1}$, and the second inverse matrix can be represented as $(HR)^{-1}$.

In some implementations, in step S101, the first data party can secretly share the first product based on the feature data and the first share of the first model parameter, and the second data party can secretly share the first product based on the second share of the first model parameter, so that each of the first data party and the second data party can obtain a share of the first product. For ease of description, a share obtained by the first data party can be used as the first share of the first product, and a share obtained by the second data party can be used as the second share of the first product. The sum of the first share of the first product and the second share of the first product is equal to the first product.

Continuing with the previous scenario example, the first share of the first model parameter can be represented as $<W>_0$, and the second share of the first model parameter can be represented as $<W>_1$, where $<W>_0+<W>_1=W$. The first data party can secretly share first product XW based on X and $<W>_0$, and the second data party can secretly share first product XW based on $<W>_1$, so that the first data party can obtain first share $<XW>_0$ of the first product, and the second data party can obtain second share $<XW>_1$ of the first product, where $<XW>_0+<XW>_1=XW$.

In some implementations, in step S103, the first data party can secretly share a value of a polynomial based on the first share of the first product, and the second data party can secretly share the value of the polynomial based on the second share of the first product, so that each of the first data party and the second data party can obtain a share of the value of the polynomial. The polynomial can be used to fit the activation function of a data processing model. As such, a share obtained by the first data party can be used as the first share of the value of the activation function, and a share obtained by the second data party can be used as the second share of the value of the activation function. The sum of the first share of the value of the activation function and the second share of the value of the activation function is equal to the value of the activation function.

Continuing the previous scenario example, the activation function can be a Sigmoid function. The value of the activation function can be represented as $\alpha=\text{sigmoid}(XW)$. The first share of the value of the activation function can be represented as $<\alpha>_0$, and the second share of the value of the activation function can be represented as $<\alpha>_1$, where $<\alpha>_0+<\alpha>_1=\alpha$, and $<\alpha>_0$, $<\alpha>_1$, and $\alpha$ are all vectors.

In some implementations, in step S105, the first data party can secretly share the gradient of the loss function based on the feature data and the first share of the value of the activation function, and the second data party can secretly share the gradient of the loss function based on the label and the second share of the value of the activation function, so that each of the first data party and the second data party can obtain a share of the gradient of the loss function. For ease of description, a share obtained by the first data party can be used as the first share of the gradient of the loss function, and a share obtained by the second data party can be used as the second share of the gradient of the loss function. The sum of the first share of the gradient of the loss function and the second share of the gradient of the loss function is equal to the gradient of the loss function.

Continuing with the previous scenario example, the first data party can secretly share gradient dW (which is a vector) of the loss function based on X and $<\alpha>_0$, and the second data party can secretly share gradient dW of the loss function based on label Y and $<\alpha>_1$, so that the first data party can obtain first share $<dW>_0$ of the gradient of the loss function, and the second data party can obtain second share $<dW>_1$ of the gradient of the loss function.

The following describes a detailed process of secret sharing dW of the loss function by the first data party and the second data party.

The first data party can secretly share $X^T<\alpha>_1$ based on X, and the second data party can secretly share $X^T<\alpha>_1$ based on $<\alpha>_1$, so that the first data party can obtain $<[X^T<\alpha>_1]>_0$, and the second data party can obtain $<[X^T<\alpha>_1]>_1$, where $<[X^T<\alpha>_1]>_0+<[X^T<\alpha>_1]>_1=X^T<\alpha>_1$.

The first data party can further secretly share $X^TY$ based on X, and the second data party can further secretly share $X^TY$ based on Y (which is a vector including the label), so that the first data party can obtain $<X^TY>_0$, and the second data party can obtain $<X^TY>_1$, where $<X^TY>_0+<X^TY>_1=X^TY$.

The first data party can calculate $X^T<\alpha>_0$, and can calculate $X^T<\alpha>_0+<[X^T<\alpha>_1]>_0-<X^TY>_0$ as first share $<dW>_0$ of gradient dW of the loss function. The second data party can calculate $<[X^T<\alpha>_1]>_1-<X^TY>_1$ as second share $<dW>_1$ of gradient dW of the loss function, where $$\begin{aligned}dW &= \langle dW\rangle_0 + \langle dW\rangle_1 \\ &= X^T\langle a\rangle_0 + \langle[X^T\langle a\rangle_1]\rangle_0 - \langle X^TY\rangle_0 + \langle[X^T\langle a\rangle_1]\rangle_1 - \langle X^TY\rangle_1 \\ &= X^T\langle a\rangle_0 + X^T\langle a\rangle_1 - X^TY \\ &= X^Ta - X^TY \\ &= X^T(a-Y).\end{aligned}$$

In some implementations, in step S107, the first data party can secretly share the Hessian matrix based on the feature data and the first share of the value of the activation function, and the second data party can secretly share the Hessian matrix based on the second share of the value of the activation function, so that each of the first data party and the second data party can obtain a share of the Hessian matrix. For ease of description, a share obtained by the first data party can be used as the first share of the Hessian matrix, and a share obtained by the second data party can be used as the second share of the Hessian matrix. The sum of the first share of the Hessian matrix and the second share of the Hessian matrix is equal to the Hessian matrix.

The first data party can secretly share a diagonal matrix based on the first share of the value of the activation function, and the second data party can secretly share the diagonal matrix based on the second share of the value of the activation function, so that each of the first data party and the second data party can obtain a share of the diagonal matrix. For ease of description, a share obtained by the first data party can be used as a first share of the diagonal matrix, and a share obtained by the second data party can be used as a second share of the diagonal matrix. The sum of the first share of the diagonal matrix and the second share of the diagonal matrix is equal to the diagonal matrix. As such, the first data party can secretly share the Hessian matrix based on the feature data and the first share of the diagonal matrix, and the second data can secretly share the Hessian matrix based on the second share of the diagonal matrix, so that the first data party can obtain the first share of the Hessian matrix, and the second data party can obtain the second share of the Hessian matrix.

Continuing with the previous scenario example, the first data party can secretly share diagonal matrix RNN based on $<\alpha>_0$, and the second data party can secretly share diagonal matrix RNN based on $<\alpha>_1$, so that the first data party can obtain first share $RNN_0$ of the diagonal matrix, and the second data party can obtain second share $RNN_1$ of the diagonal matrix.

The following describes a detailed process of secret sharing diagonal matrix RNN by the first data party and the second data party.

The first data party can secretly share $<\alpha>_0 \cdot <\alpha>_1$ based on $<\alpha>_0$, and the second data party can secretly share $<\alpha>_0 \cdot <\alpha>_1$ based on $<\alpha>_1$, so that the first data party can obtain $<[<\alpha>_0 \cdot <\alpha>_1]>_0$, and the second data party can obtain $<[<\alpha>_0 \cdot <\alpha>_1]>_1$, where $<[<\alpha>_0 \cdot <\alpha>_1]>_0 + <[<\alpha>_0 \cdot <\alpha>_1]>_1 = <\alpha>_0 \cdot <\alpha>_1$, and $\cdot$ represents a bitwise multiplication operation. For example, there are vector $m=(m_1, m_2, m_3)$ and vector $n=(n_1, n_2, n_3)$. In this case, $m \cdot n=(m_1 n_1, m_2 n_2, m_3 n_3)$.

The first data party can calculate $<r>_0 = <\alpha>_0 - <[<\alpha>_0 \cdot <\alpha>_1]>_0 - <\alpha>_0 \cdot <\alpha>_0$, and the second data party can calculate $<r>_1 = <\alpha>_1 - <[<\alpha>_0 \cdot <\alpha>_1]>_0 - <\alpha>_1 \cdot <\alpha>_1$, where $$\begin{aligned} r &= \langle r \rangle_0 + \langle r \rangle_1 \\ &= \langle a \rangle_0 - \langle [\langle a \rangle_0 \cdot \langle a \rangle_1] \rangle_0 - \langle a \rangle_0 \cdot \langle a \rangle_0 + \langle a \rangle_1 - \\ &\quad \langle [\langle a \rangle_0 \cdot \langle a \rangle_1] \rangle_0 - \langle a \rangle_1 \cdot \langle a \rangle_1 \\ &= \{\langle a \rangle_0 + \langle a \rangle_1\}\{1 - \langle a \rangle_0 - \langle a \rangle_1\} \\ &= a(1-a), \end{aligned}$$

and $<r>_0$, $<r>_1$, and r are all vectors. Therefore, the first data party can generate first share $RNN_0 = diag(<r>_0)$ of diagonal matrix $RNN = diag(r)$ based on $<r>_0$, and the second data party can generate second share $RNN_1 = diag(<r>_1)$ of diagonal matrix $RNN = diag(r)$ based on $<r>_1$, where $RNN_0 + RNN_1 = RNN$. Each of first share $RNN_0$ and second share $RNN_1$ of diagonal matrix RNN can be a diagonal matrix. In an actual processing process, the first data party can use a data element in $<r>_0$ as a data element in a main diagonal of $RNN_0$. As such, $RNN_0$ is generated based on $<r>_0$. A data element in $<r>_1$ can be used as a data element in a main diagonal of $RNN_1$. As such, $RNN_1$ is generated based on $<r>_1$.

The first data party can secretly share Hessian matrix H based on X and $RNN_0$, and the second data party can secretly share Hessian matrix H based on $RNN_1$, so that the first data party can obtain first share $<H>_0$ of the Hessian matrix, and the second data party can obtain second share $<H>_1$ of the Hessian matrix.

The following describes a detailed process of secret sharing Hessian matrix H by the first data party and the second data party.

The first data party can secretly share $X^T RNN_1$ based on X, and the second data party can secretly share $X^T RNN_1$ based on $RNN_1$, so that the first data party can obtain $<X^T RNN_1>_0$, and the second data party can obtain $<X^T RNN_1>_1$, where $<X^T RNN_1>_0 + <X^T RNN_1>_1 = X^T RNN_1$.

The first data party can further secretly share $<X^T RNN_1>_1 X$ based on X, and the second data party can further secretly share $<X^T RNN_1>_1 X$ based on $<X^T RNN_1>_1$, so that the first data party can obtain $<[<X^T RNN_1>_1 X]>_0$, and the second data party can obtain $<[<X^T RNN_1>_1 X]>_1$, where $<[<X^T RNN_1>_1 X]>_0 + <[<X^T RNN_1>_1 X]>_1 = <X^T RNN_1>_1 X$.

The first data party can calculate $X^T RNN_0 X + <X^T RNN_1>_0 X + <[<X^T RNN_1>_1 X]>_0$ as first share $<H>_0$ of Hessian matrix H. The second data party can use $<[<X^T RNN_1>_1 X]>_1$ as second share $<H>_0$ of Hessian matrix H, where $$\begin{aligned} H &= \langle H \rangle_0 + \langle H \rangle_1 \\ &= X^T RNN_0 X + \langle X^T RNN_1 \rangle_0 X + \langle [\langle X^T RNN_1 \rangle_1 X] \rangle_0 + \\ &\quad \langle [\langle X^T RNN_1 \rangle_1 X] \rangle_1 \\ &= X^T RNN_0 X + \langle X^T RNN_1 \rangle_0 X + \langle X^T RNN_1 \rangle_1 X \\ &= X^T RNN_0 X + X^T RNN_1 X \\ &= X^T RNN X. \end{aligned}$$

In some implementations, a third party can send the first share of the random orthogonal matrix to the first data party, and can send the second share of the random orthogonal matrix to the second data party. The sum of the first share of the random orthogonal matrix and the second share of the random orthogonal matrix is equal to the random orthogonal matrix. The first data party can receive the first share of the random orthogonal matrix, and the second data party can receive the second share of the random orthogonal matrix. As such, in step S109, the first data party can secretly share the second product based on the first share of the random orthogonal matrix and the first share of the Hessian matrix, and the second data party can secretly share the second product based on the second share of the random orthogonal matrix and the second share of the Hessian matrix, so that each of the first data party and the second data party can obtain a share of the second product. For ease of description, a share obtained by the first data party can be used as the first share of the second product, and a share obtained by the second data party can be used as the second share of the second product. The sum of the first share of the second product and the second share of the second product is equal to the second product.

Continuing with the previous scenario example, the first share of the random orthogonal matrix can be represented as $<R>_0$, and the second share of the random orthogonal matrix can be represented as $<R>_1$, where $<R>_0 + <R>_1 = R$. The first data party can secretly share second product HR based on $<R>_0$ and $<H>_0$, and the second data party can secretly share second product HR based on $<R>_1$ and $<H>_1$, so that the first data party can obtain first share $<HR>_0$ of the second product, and the second data party can obtain second share $<HR>_1$ of the second product.

The following describes a detailed process of secret sharing second product HR by the first data party and the second data party.

The first data party can secretly share $<H>_0 <R>_1$ based on $<H>_0$, and the second data party can secretly share $<H>_0 <R>_1$ based on $<R>_1$, so that the first data party can obtain $<[<H>_0 <R>_1]>_0$, and the second data party can obtain $<[<H>_0 <R>_1]>_1$, where $<[<H>_0 <R>_1]>_0 + <[<H>_0 <R>_1]>_1 = <H>_0 <R>_1$.

The first data party can further secretly share $<H>_1 <R>_0$ based on $<R>_0$, and the second data party can further secretly share $<H>_1 <R>_0$ based on $<H>_1$, so that the first data party can obtain $<[<H>_1 <R>_0]>_0$, and the second data party can obtain $<[<H>_1 <R>_0]>_1$, where $<[<H>_1 <R>_0]>_0 + <[<H>_1 <R>_0]>_1 = <H>_1 <R>_0$.

The first data party can calculate $<H>_0 <R>_0 + <[<H>_0 <R>_1]>_0 + <[<H>_1 <R>_0]>_0$ as first share $<HR>_0$ of the second product. The second data party can calculate $<H>_1 <R>_1 + <[<H>_0 <R>_1]>_1 + <[<H>_1 <R>_0]>_1$ as second share $<HR>_1$ of the second product, where $$\begin{aligned}
HR &= \langle HR \rangle_0 + \langle HR \rangle_1 \\
&= \langle H \rangle_0 \langle R \rangle_0 + \langle [\langle H \rangle_0 \langle R \rangle_1] \rangle_0 + \langle [\langle H \rangle_1 \langle R \rangle_0] \rangle_0 + \\
&\quad \langle H \rangle_1 \langle R \rangle_1 + \langle [\langle H \rangle_0 \langle R \rangle_1] \rangle_1 + \langle [\langle H \rangle_1 \langle R \rangle_0] \rangle_1 \\
&= \langle H \rangle_0 \langle R \rangle_0 + \langle H \rangle_0 \langle R \rangle_1 + \langle H \rangle_1 \langle R \rangle_0 + \langle H \rangle_1 \langle R \rangle_1 \\
&= (\langle H \rangle_0 + \langle H \rangle_1)(\langle R \rangle_0 + \langle R \rangle_1).
\end{aligned}$$

In some implementations, the predetermined condition can include: a condition number is less than or equal to a predetermined threshold. The predetermined threshold can be an empirical value, or can be obtained in another way (for example, through machine learning).

Both the first data party and the second data party can hold the predetermined condition. Then, the first data party and the second data party can determine whether the condition number of the second product satisfies the predetermined condition. In some implementations, the first data party can calculate the condition number of the second product. The second data party can send the second share of the second product to the first data party. The first data party can receive the second share of the second product; can add the second share of the second product and the first share of the second product that is held by the first data party, to obtain the second product; can calculate the condition number of the second product; can determine whether the condition number of the second product satisfies the predetermined condition; and can send the condition number of the second product to the second data party. The second data party can receive the condition number of the second product; and can determine whether the condition number of the second product satisfies the predetermined condition. In some other implementations, the second data party can calculate the condition number of the second product. The first data party can send the first share of the second product to the second data party. The second data party can receive the first share of the second product; can add the first share of the second product and the second share of the second product that is held by the second data party, to obtain the second product; can calculate the condition number of the second product; can determine whether the condition number of the second product satisfies the predetermined condition; and can send the condition number of the second product to the first data party. The first data party can receive the condition number of the second product; and can determine whether the condition number of the second product satisfies the predetermined condition.

Alternatively, only the first data party can hold the predetermined condition, and then only the first data party determines whether the condition number of the second product satisfies the predetermined condition. The second data party can send the second share of the second product to the first data party. The first data party can receive the second share of the second product; can add the second share of the second product and the first share of the second product that is held by the first data party, to obtain the second product; can calculate the condition number of the second product; can determine whether the condition number of the second product satisfies the predetermined condition; and can send determination result information to the second data party. The second data party can receive the determination result information.

Alternatively, only the second data party can hold the predetermined condition, and then only the second data party determines whether the condition number of the second product satisfies the predetermined condition. The first data party can send the first share of the second product to the second data party. The second data party can receive the first share of the second product; can add the first share of the second product and the second share of the second product that is held by the second data party, to obtain the second product; can calculate the condition number of the second product; can determine whether the condition number of the second product satisfies the predetermined condition; and can send determination result information to the first data party. The first data party can receive the determination result information.

As described above, a new matrix can be obtained after a square matrix is multiplied by an orthogonal matrix, and the new matrix has the same condition number as the square matrix. The Hessian matrix is a square matrix, and therefore the condition number of the second product is equal to a condition number of the Hessian matrix. As such, the first data party and the second data party can obtain the condition number of the Hessian matrix through cooperative calculation without leaking the shares of the Hessian matrix that are held by the first data party and the second data party.

In some implementations, when the condition number of the second product satisfies the predetermined condition, it indicates that the second product has a relatively low ill-condition degree, in other words, it indicates that the Hessian matrix has a relatively low ill-condition degree. Therefore, a model parameter can be determined by using a Newton's method. As such, in step S111, the first data party can secretly share the first inverse matrix based on the first share of the Hessian matrix, and the second data party can secretly share the first inverse matrix based on the second share of the Hessian matrix, so that the first data party can obtain the first share of the first inverse matrix, and the second data party can obtain the second share of the first inverse matrix.

In some implementations, the second data party can perform inversion processing on the second product. The first data party can send the first share of the second product to the second data party. The second data party can receive the first share of the second product; and can add the first share of the second product and the second share of the second product that is held by the second data party, to obtain the second product. The second product is a square matrix, and therefore the second data party can perform inversion processing on the second product, to obtain an inverse matrix of the second product as a second inverse matrix; and can send the second inverse matrix to the first data party. The first data party can receive the second inverse matrix. Alternatively, in some other implementations, the first data party can perform inversion processing on the second product. The second data party can send the second share of the second product to the first data party. The first data party can receive the second share of the second product; and can add the second share of the second product and the first share of the second product that is held by the first data party, to obtain the second product. The second product is a square matrix, and therefore the first data party can perform inversion processing on the second product, to obtain an inverse matrix of the second product as a second inverse matrix; and can send the second inverse matrix to the second data party. The second data party can receive the second inverse matrix.

The first data party can multiply the first share of the random orthogonal matrix by the second inverse matrix, to obtain the first share of the first inverse matrix. The second data party can multiply the second share of the random orthogonal matrix by the second inverse matrix, to obtain the second share of the first inverse matrix. The sum of the first share of the first inverse matrix and the second share of the first inverse matrix is equal to the first inverse matrix.

Continuing the previous scenario example, the second data party performs inversion processing on second product HR here. The first data party can send first share $<HR>_0$ of the second product to the second data party. The second data party can receive first share $<HR>_0$ of the second product; can add first share $<HR>_0$ of the second product and second share $<HR>_1$ of the second product that is held by the second data party, to obtain second product HR; can perform inversion processing on second product HR, to obtain second inverse matrix $(HR)^{-1}$; and can send second inverse matrix $(HR)^{-1}$ to the first data party. The first data party can receive second inverse matrix $(HR)^{-1}$.

The first data party can multiply second inverse matrix $(HR)^{-1}$ by first share $<R>_0$ of the random orthogonal matrix, to obtain first share $<H^{-1}>_0$ of first inverse matrix $H^{-1}$. The second data party can multiply second inverse matrix $(HR)^{-1}$ by second share $<R>_1$ of the random orthogonal matrix, to obtain second share $<H^{-1}>_1$ of first inverse matrix $H^{-1}$, where $H^{-1}=<H^{-1}>_0+<H^{-1}>_1=<R>_0 (HR)^{-1}+<R>_1 (HR)^{-1}=R \times (HR)^{-1}$.

In some implementations, in step S113, the first data party can secretly share a third product based on the first share of the first inverse matrix and the first share of the gradient of the loss function, and the second data party can secretly share the third product based on the second share of the first inverse matrix and the second share of the gradient of the loss function, so that each of the first data party and the second data party can obtain a share of the third product. For ease of description, a share obtained by the first data party can be used as a first share of the third product, and a share obtained by the second data party can be used as a second share of the third product. The sum of the first share of the third product and the second share of the third product is equal to the third product.

The first data party can subtract the first share of the third product from the first share of the first model parameter, to obtain the first share of the new first model parameter. The second data party can subtract the second share of the third product from the second share of the first model parameter, to obtain the second share of the new first model parameter.

Continuing with the previous scenario example, the first data party can secretly share third product $H^{-1} \times dW$ based on $<H^{-1}>_0$ and $<dW>_0$, and the second data party can secretly share third product $H^{-1} \times dW$ based on $<H^{-1}>_1$ and $<dW>_1$, so that the first data party can obtain first share $<H^{-1} \times dW>_0$ of the third product, and the second data party can obtain second share $<H^{-1} \times dW>_1$ of the third product.

The following describes a detailed process of secret sharing third product $H^{-1} \times dW$ by the first data party and the second data party.

The first data party can secretly share $<H^{-1}>_0<dW>_1$ based on $<H^{-1}>_0$, and the second data party can secretly share $<H^{-1}>_0<dW>_1$ based on $<dW>_1$, so that the first data party can obtain $<[<H^{-1}>_0<dW>_1]>_0$, and the second data party can obtain $<[<H^{-1}>_0<dW>_1]>_1$, where $<[<H^{-1}>_0<dW>_1]>_0+<[<H^{-1}>_0<dW>_1]>_1=<H^{-1}>_0<dW>_1$.

The first data party can further secretly share $<H^{-1}>_1<dW>_0$ based on $<dW>_0$, and the second data party can further secretly share $<H^{-1}>_1<dW>_0$ based on $<H^{-1}>_1$, so that the first data party can obtain $<[<H^{-1}>_1<dW>_0]>_0$, and the second data party can obtain $<[<H^{-1}>_1<dW>_0]>_1$, where $<[<H^{-1}>_1<dW>_0]>_0+<[<H^{-1}>_1<dW>_0]>_1=<H^{-1}>_1<dW>_0$.

The first data party can calculate $<H^{-1}>_0<dW>_0+<[<H^{-1}>_0<dW>_1]>_0+<[<H^{-1}>_1<dW>_0]>_0$ as first share $<H^{-1} \times dW>_0$ of the third product. The second data party can calculate $<H^{-1}>_1<dW>_1+<[<H^{-1}>_0<dW>_1]>_1+<[<H^{-1}>_1<dW>_0]>_1$ as second share $<H^{-1} \times dW>_1$ of the third product, where $$\begin{aligned}H^{-1} \times dW &= \langle H^{-1} \times dW\rangle_0 + \langle H^{-1} \times dW\rangle_1\\ &= \langle H^{-1}\rangle_0\langle dW\rangle_0 + \langle[\langle H^{-1}\rangle_0\langle dW\rangle_1]\rangle_0 +\\ &\quad \langle[\langle H^{-1}\rangle_1\langle dW\rangle_0]\rangle_0 +\\ &\quad \langle H^{-1}\rangle_1\langle dW\rangle_1 + \langle[\langle H^{-1}\rangle_0\langle dW\rangle_1]\rangle_1 +\\ &\quad \langle[\langle H^{-1}\rangle_1\langle dW\rangle_0]\rangle_1\\ &= \langle H^{-1}\rangle_0\langle dW\rangle_0 + \langle H^{-1}\rangle_0\langle dW\rangle_1 + \langle H^{-1}\rangle_1\langle dW\rangle_0 +\\ &\quad \langle H^{-1}\rangle_1\langle dW\rangle_1\\ &= (\langle H^{-1}\rangle_0 + \langle H^{-1}\rangle_1)(\langle dW\rangle_0 + \langle dW\rangle_1).\end{aligned}$$

The first data party can calculate $<W'>_0=<W>_0-H^{-1} \times dW>_0$, and the second data party can calculate $<W'>_1=<W>_1-H^{-1} \times dW>_1$, where $<W'>_0$ represents the first share of the new first model parameter, $<W'>_1$ represents the second share of the new first model parameter, W' represents the new first model parameter, and $W'=<W'>_0+<W'>_1=<W>_0-H^{-1} \times dW>_0+<W>_1-H^{-1} \times dW>_1=W-H^{-1} \times dW$.

In some implementations, when the condition number of the second product does not satisfy the predetermined condition, it indicates that the second product has a relatively high ill-condition degree, in other words, it indicates that the Hessian matrix has a relatively high ill-condition degree, and a Newton's method cannot be used to determine a model parameter. Therefore, a gradient descent method instead of the Newton's method can be used to determine a model parameter. The first data party can calculate the first share of the new first model parameter based on the first share of the first model parameter, the first share of the gradient of the loss function, and a predetermined step size. The second data party can calculate the second share of the new first model parameter based on the second share of the first model parameter, the second share of the gradient of the loss function, and the predetermined step size.

The predetermined step size can be used to control a rate of iteration of the gradient descent method. The predetermined step size can be any proper positive real number. For example, when there is an excessively large predetermined step size, the rate of iteration is excessively high, and consequently an optimal model parameter may fail to be obtained. When there is an excessively small predetermined step size, the rate of iteration is excessively low, and consequently a relatively long time is consumed. The predetermined step size can be an empirical value, or can be obtained through machine learning. Certainly, the predetermined step size can be alternatively obtained in another way. Both the first data party and the second data party can hold the predetermined step size.

The first data party can multiply the first share of the gradient of the loss function by the predetermined step size, to obtain a fourth product; and can subtract the fourth product from the first share of the first model parameter, to obtain the first share of the new first model parameter. The second data party can multiply the second share of the gradient of the loss function by the predetermined step size, to obtain a fifth product; and can subtract the fifth product from the second share of the first model parameter, to obtain the second share of the new first model parameter. The sum of the first share of the new first model parameter and the second share of the new first model parameter is equal to the new first model parameter.

Continuing the previous scenario example, the first data party can multiply first share $<dW>_0$ (which is a vector) of the gradient of the loss function by predetermined step size G, to obtain fourth product $G<dW>_0$; and can subtract fourth product $G<dW>_0$ from first share $<W>_0$ of the first model parameter, to obtain first share $<W'>_0=<W>_0-G<dW>_0$ of the new first model parameter.

The second data party can multiply second share $<dW>_1$ (which is a vector) of the gradient of the loss function by predetermined step size G (which is a vector multiplication), to obtain fifth product $G<dW>_1$; and can subtract fifth product $G<dW>_1$ from second share $<W>_1$ of the first model parameter, to obtain second share $<W'>_1=<W>_1-G<dW>_1$ of the new first model parameter, where $<W'>_0+<W'>_1=W'$, and $W'$ represents the new first model parameter.

In some implementations, a process of optimizing and adjusting a model parameter of the data processing model through iteration can be further included.

Step S101 can be repeatedly performed, so that the first data party can obtain a first share of a new first product, and the second data party can obtain a second share of the new first product. The new first product is a product of the feature data and the new first model parameter. Step S103 can be repeatedly performed, so that the first data party can obtain a first share of a value of a new activation function, and the second data party can obtain a second share of the value of the new activation function. Step S105 can be repeatedly performed, so that the first data party can obtain a first share of a gradient of a new loss function, and the second data party can obtain a second share of the gradient of the new loss function. Step S107 can be repeatedly performed, so that the first data party can obtain a first share of a new Hessian matrix, and the second data party can obtain a second share of the new Hessian matrix. Step S109 can be repeatedly performed, so that the first data party can obtain a first share of a new second product, and the second data party can obtain a second share of the new second product. The new second product is a product of the random orthogonal matrix and the new Hessian matrix.

When a condition number of the new second product satisfies the predetermined condition, it indicates that the Newton's method can continue to be used to determine a model parameter in the current round of iteration. Step S111 can be repeatedly performed, so that the first data party can obtain a first share of a new first inverse matrix, and the second data party can obtain a second share of the new first inverse matrix. The new first inverse matrix is an inverse matrix of the new Hessian matrix. The first data party can secretly share a second model parameter based on the first share of the new first model parameter, the first share of the new first inverse matrix, and the first share of the gradient of the new loss function, and the second data party can secretly share the second model parameter based on the second share of the new first model parameter, the second share of the new first inverse matrix, and the second share of the gradient of the mew loss function, so that the first data party can obtain a first share of the second model parameter, and the second data party can obtain a second share of the second model parameter. The sum of the first share of the second model parameter and the second share of the second model parameter is equal to the second model parameter.

When a condition number of the new second product does not satisfy the predetermined condition, it indicates that the Newton's method cannot continue to be used to determine a model parameter in the current round of iteration. Therefore, the gradient descent method instead of the Newton's method can be used to determine a model parameter. The first data party can calculate the first share of the second model parameter based on the first share of the new first model parameter, the first share of the gradient of the new loss function, and the predetermined step size. The second data party can calculate the second share of the second model parameter based on the second share of the new first model parameter, the second share of the gradient of the new loss function, and the predetermined step size. The sum of the first share of the second model parameter and the second share of the second model parameter is equal to the second model parameter.

In the present implementation, the first data party and the second data party can cooperatively determine the model parameter of the data processing model by using a secret sharing algorithm without leaking data held by the first data party and the second data party. In addition, in the model parameter determining method in the present implementation, a problem of non-convergence caused by an ill-conditioned matrix in the process of determining a model parameter by using the Newton's method can be avoided by using the condition number and the predetermined condition.

Figure 3:
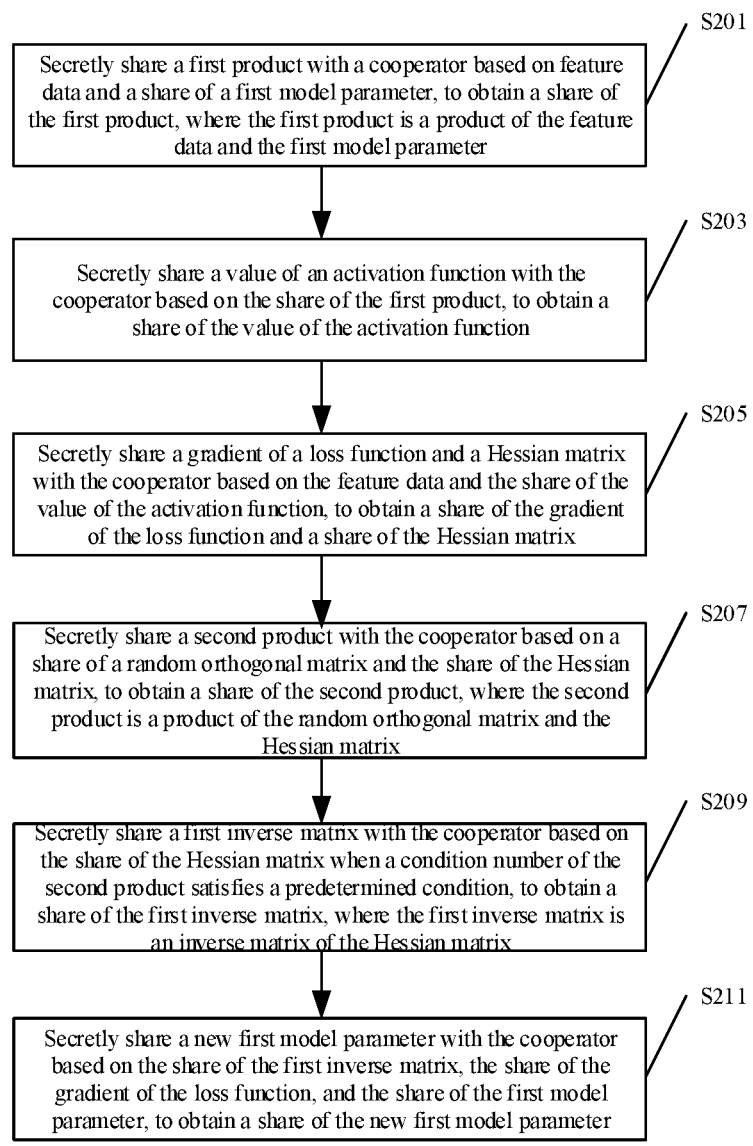
FIG. 3 is a flowchart illustrating a model parameter determining method, according to an implementation of the present specification.

Based on the same inventive concept, the present specification further provides an implementation of another model parameter determining method. The present implementation is executed by a first data party, and the first data party can hold feature data and a share of a first model parameter. Referring to FIG. 3, the present implementation can include the following steps.

Step S201: Secretly share a first product with a cooperator based on the feature data and the share of the first model parameter, to obtain a share of the first product, where the first product is a product of the feature data and the first model parameter.

In some implementations, the cooperator can be understood as a data party that performs cooperative security modeling with the first data party, and can be the previous second data party.

Step S203: Secretly share a value of an activation function with the cooperator based on the share of the first product, to obtain a share of the value of the activation function.

In some implementations, the first data party can secretly share a value of a polynomial with the cooperator based on the share of the first product, to obtain a share of the value of the polynomial as the share of the value of the activation function, where the polynomial is used to fit the activation function.

Step S205: Secretly share a gradient of a loss function and a Hessian matrix with the cooperator based on the feature data and the share of the value of the activation function, to obtain a share of the gradient of the loss function and a share of the Hessian matrix.

Step S207: Secretly share a second product with the cooperator based on a share of a random orthogonal matrix and the share of the Hessian matrix, to obtain a share of the second product, where the second product is a product of the random orthogonal matrix and the Hessian matrix.

Step S209: Secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix.

In some implementations, the predetermined condition can include: a condition number is less than or equal to a predetermined threshold. The condition number of the second product can be calculated by the first data party and/or the cooperator. The condition number of the second product is equal to a condition number of the Hessian matrix.

In some implementations, when the condition number of the second product satisfies the predetermined condition, it indicates that the second product has a relatively low ill-condition degree, and a model parameter can be determined by using a Newton's method. As such, the first data party can secretly share the first inverse matrix with the cooperator based on the share of the Hessian matrix, to obtain the share of the first inverse matrix.

Step S211: Secretly share a new first model parameter with the cooperator based on the share of the first inverse matrix, the share of the gradient of the loss function, and the share of the first model parameter, to obtain a share of the new first model parameter.

In some implementations, the first data party can secretly share a third product with the cooperator based on the share of the first inverse matrix and the share of the gradient of the loss function, to obtain a share of the third product. The third product can be a product of the first inverse matrix and the gradient of the loss function. The first data party can subtract the share of the third product from the share of the first model parameter, to obtain the share of the new first model parameter.

In some implementations, when the condition number of the second product does not satisfy the predetermined condition, it indicates that the second product has a relatively high ill-condition degree, and a Newton's method cannot be used to determine a model parameter. Therefore, a gradient descent method instead of the Newton's method can be used to determine a model parameter. The first data party can calculate the share of the new first model parameter based on the share of the first model parameter, the share of the gradient of the loss function, and a predetermined step size. The first data party can multiply the share of the gradient of the loss function by the predetermined step size, to obtain a fourth product; and can subtract the fourth product from the share of the first model parameter, to obtain the share of the new first model parameter.

In some implementations, a process of optimizing and adjusting a model parameter of a data processing model through iteration can be further included.

The first data party can repeatedly perform step S201, step S203, step S205, and step S207.

When a condition number of a new second product satisfies the predetermined condition, it indicates that the Newton's method can continue to be used to determine a model parameter. The first data party can repeatedly perform step S209, so that the first data party can secretly share a second model parameter with the cooperator based on a share of a new first inverse matrix, a share of a gradient of a new loss function, and the share of the new first model parameter, to obtain a share of the second model parameter.

When a condition number of a new second product does not satisfy the predetermined condition, it indicates that a gradient descent method instead of the Newton's method needs to be used to determine a model parameter. The first data party can calculate a share of a second model parameter based on the share of the new first model parameter, a share of a gradient of a new loss function, and a predetermined step size.

In the present implementation, the first data party can determine the model parameter of the data processing model by cooperating with the cooperator by using a secret sharing algorithm without leaking data held by the first data party, to obtain the share of the new first model parameter.

Figure 4:
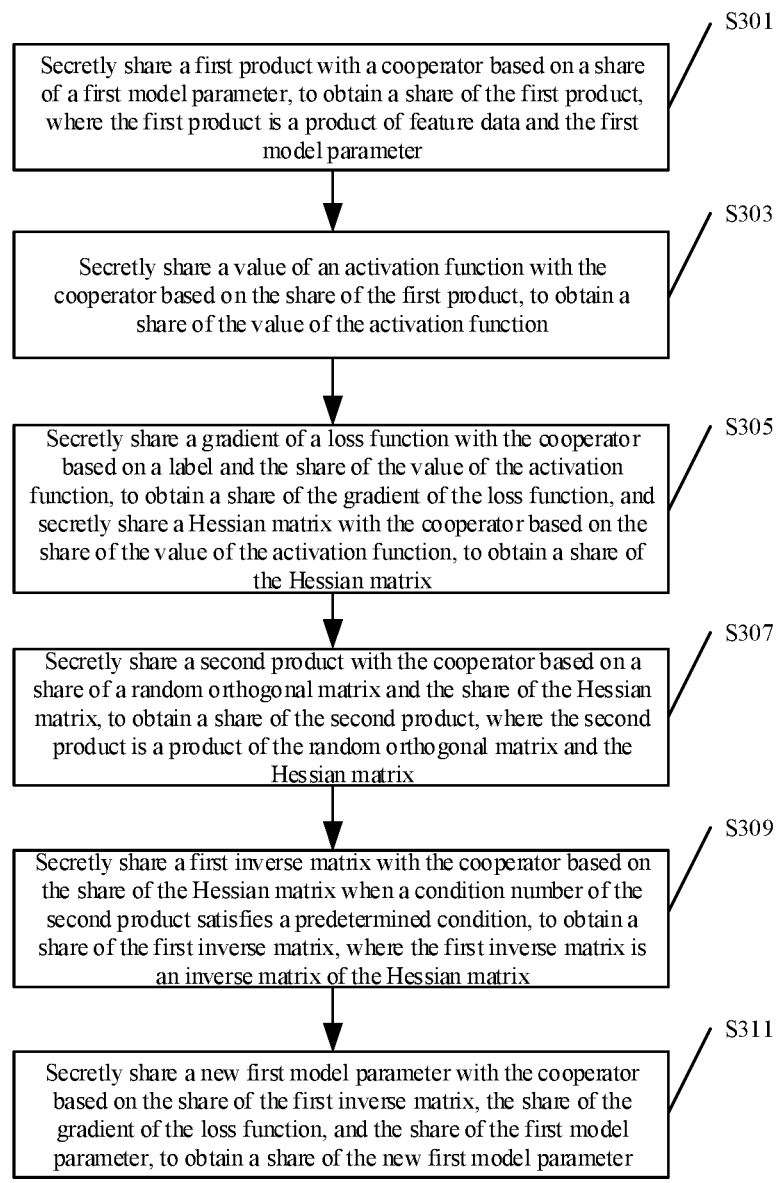
FIG. 4 is a flowchart illustrating a model parameter determining method, according to an implementation of the present specification.

Based on the same inventive concept, the present specification further provides an implementation of another model parameter determining method. The present implementation is executed by a second data party, and the second data party can hold a label and a share of a first model parameter. Referring to FIG. 4, the present implementation can include the following steps.

Step S301: Secretly share a first product with a cooperator based on the share of the first model parameter, to obtain a share of the first product, where the first product is a product of feature data and the first model parameter.

In some implementations, the cooperator can be understood as a data party that performs cooperative security modeling with the second data party, and can be the previous first data party.

Step S303: Secretly share a value of an activation function with the cooperator based on the share of the first product, to obtain a share of the value of the activation function.

In some implementations, the second data party can secretly share a value of a polynomial with the cooperator based on the share of the first product, to obtain a share of the value of the polynomial as the share of the value of the activation function, where the polynomial is used to fit the activation function.

Step S305: Secretly share a gradient of a loss function with the cooperator based on the label and the share of the value of the activation function, to obtain a share of the gradient of the loss function, and secretly share a Hessian matrix with the cooperator based on the share of the value of the activation function, to obtain a share of the Hessian matrix.

Step S307: Secretly share a second product with the cooperator based on a share of a random orthogonal matrix and the share of the Hessian matrix, to obtain a share of the second product, where the second product is a product of the random orthogonal matrix and the Hessian matrix.

Step S309: Secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix.

In some implementations, the predetermined condition can include: a condition number is less than or equal to a predetermined threshold. The condition number of the second product can be calculated by the second data party and/or the cooperator. The condition number of the second product is equal to a condition number of the Hessian matrix.

In some implementations, when the condition number of the second product satisfies the predetermined condition, it indicates that the second product has a relatively low ill-condition degree, and a model parameter can be determined by using a Newton's method. As such, the second data party can secretly share the first inverse matrix with the cooperator based on the share of the Hessian matrix, to obtain the share of the first inverse matrix.

Step S311: Secretly share a new first model parameter with the cooperator based on the share of the first inverse matrix, the share of the gradient of the loss function, and the share of the first model parameter, to obtain a share of the new first model parameter.

In some implementations, the second data party can secretly share a third product with the cooperator based on the share of the first inverse matrix and the share of the gradient of the loss function, to obtain a share of the third product. The third product can be a product of the first inverse matrix and the gradient of the loss function. The second data party can subtract the share of the third product from the share of the first model parameter, to obtain the share of the new first model parameter.

In some implementations, when the condition number of the second product does not satisfy the predetermined condition, it indicates that the second product has a relatively high ill-condition degree, and a Newton's method cannot be used to determine a model parameter. Therefore, a gradient descent method instead of the Newton's method can be used to determine a model parameter. The second data party can calculate the share of the new first model parameter based on the share of the first model parameter, the share of the gradient of the loss function, and a predetermined step size. The second data party can multiply the share of the gradient of the loss function by the predetermined step size, to obtain a fourth product; and can subtract the fourth product from the share of the first model parameter, to obtain the share of the new first model parameter.

In some implementations, a process of optimizing and adjusting a model parameter of a data processing model through iteration can be further included.

The second data party can repeatedly perform step S301, step S303, step S305, and step S307.

When a condition number of a new second product satisfies the predetermined condition, it indicates that the Newton's method can continue to be used to determine a model parameter. The second data party can repeatedly perform step S309, so that the second data party can secretly share a second model parameter with the cooperator based on a share of a new first inverse matrix, a share of a gradient of a new loss function, and the share of the new first model parameter, to obtain a share of the second model parameter.

When a condition number of a new second product does not satisfy the predetermined condition, it indicates that a gradient descent method instead of the Newton's method needs to be used to determine a model parameter. The second data party can calculate a share of a second model parameter based on the share of the new first model parameter, a share of a gradient of a new loss function, and a predetermined step size.

In the present implementation, the second data party can determine the model parameter of the data processing model by cooperating with the cooperator by using a secret sharing algorithm without leaking data held by the second data party, to obtain the share of the new first model parameter.

Figure 5:
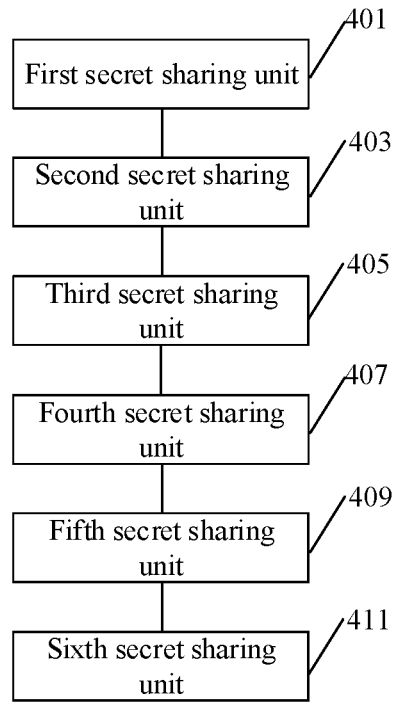
FIG. 5 is a schematic diagram illustrating a model parameter determining apparatus, according to an implementation of the present specification.

Based on the same inventive concept, the present specification further provides an implementation of a model parameter determining apparatus. Referring to FIG. 5, the present implementation can be applied to a first data party, and the apparatus can include the following: a first secret sharing unit 401, configured to secretly share a first product with a cooperator based on feature data and a share of a first model parameter, to obtain a share of the first product, where the first product is a product of the feature data and the first model parameter; a second secret sharing unit 403, configured to secretly share a value of an activation function with the cooperator based on the share of the first product, to obtain a share of the value of the activation function; a third secret sharing unit 405, configured to secretly share a gradient of a loss function and a Hessian matrix with the cooperator based on the feature data and the share of the value of the activation function, to obtain a share of the gradient of the loss function and a share of the Hessian matrix; a fourth secret sharing unit 407, configured to secretly share a second product with the cooperator based on a share of a random orthogonal matrix and the share of the Hessian matrix, to obtain a share of the second product, where the second product is a product of the random orthogonal matrix and the Hessian matrix; a fifth secret sharing unit 409, configured to secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and a sixth secret sharing unit 411, configured to secretly share a new first model parameter with the cooperator based on the share of the first inverse matrix, the share of the gradient of the loss function, and the share of the first model parameter, to obtain a share of the new first model parameter.

Figure 6:
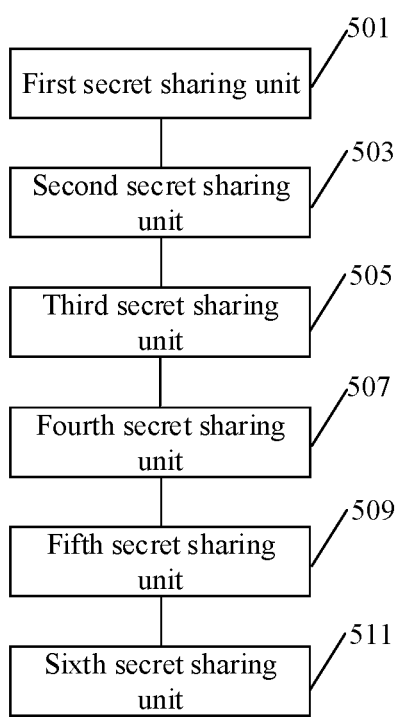
FIG. 6 is a schematic diagram illustrating a model parameter determining apparatus, according to an implementation of the present specification.

Based on the same inventive concept, the present specification further provides an implementation of a model parameter determining apparatus. Referring to FIG. 6, the present implementation can be applied to a second data party, and the apparatus can include the following: a first secret sharing unit 501, configured to secretly share a first product with a cooperator based on a share of a first model parameter, to obtain a share of the first product, where the first product is a product of feature data and the first model parameter; a second secret sharing unit 503, configured to secretly share a value of an activation function with the cooperator based on the share of the first product, to obtain a share of the value of the activation function; a third secret sharing unit 505, configured to secretly share a gradient of a loss function and a Hessian matrix with the cooperator based on the share of the value of the activation function, to obtain a share of the gradient of the loss function and a share of the Hessian matrix; a fourth secret sharing unit 507, configured to secretly share a second product with the cooperator based on a share of a random orthogonal matrix and the share of the Hessian matrix, to obtain a share of the second product, where the second product is a product of the random orthogonal matrix and the Hessian matrix; a fifth secret sharing unit 509, configured to secretly share a first inverse matrix with the cooperator based on the share of the Hessian matrix when a condition number of the second product satisfies a predetermined condition, to obtain a share of the first inverse matrix, where the first inverse matrix is an inverse matrix of the Hessian matrix; and a sixth secret sharing unit 511, configured to secretly share a new first model parameter with the cooperator based on the share of the first inverse matrix, the share of the gradient of the loss function, and the share of the first model parameter, to obtain a share of the new first model parameter.

Figure 7:
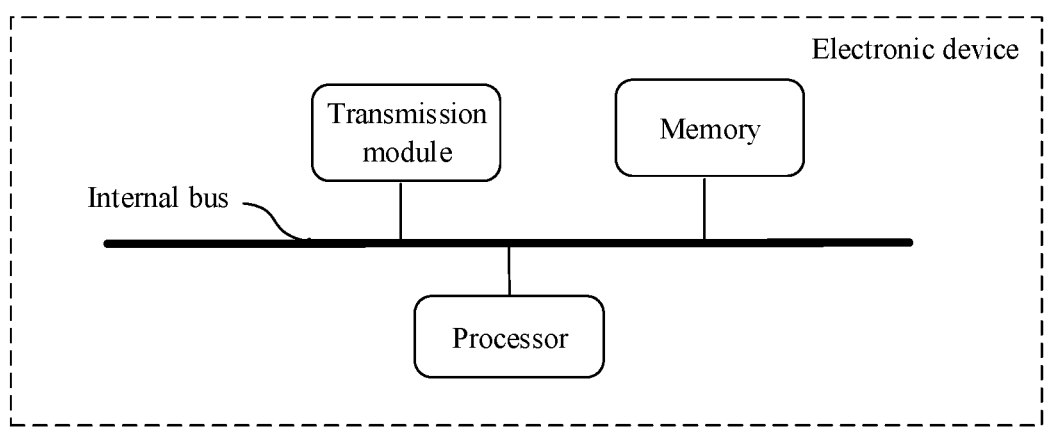
FIG. 7 is a functional structural diagram of an electronic device, according to an implementation of the present specification.

The following describes an implementation of an electronic device in the present specification. FIG. 7 is a schematic diagram of a hardware structure of an electronic device according to the present implementation. As shown in FIG. 7, the electronic device can include one or more processors (only one processor is shown in the figure), memories, and transmission modules. Certainly, a person of ordinary skill in the art can understand that the hardware structure shown in FIG. 7 is merely an example, and constitutes no limitation on the hardware structure of the electronic device. In practice, the electronic device can further include more or fewer component units than those shown in FIG. 7, or have a configuration different from that shown in FIG. 7.

The memory can include a high-speed random access memory, or can include a nonvolatile memory, for example, one or more magnetic storage apparatuses, flash memories, or other nonvolatile solid-state memories. Certainly, the memory can further include a remotely disposed network memory. The remotely disposed network memory can be connected to the electronic device by using a network such as the Internet, an intranet, a local area network, or a mobile communications network. The memory can be configured to store a program instruction or a module of application software, for example, a program instruction or a module in the implementation corresponding to FIG. 3 in the present specification, and/or a program instruction or a module in the implementation corresponding to FIG. 4 in the present specification.

The processor can be implemented in any approximate way. For example, the processor can be a microprocessor, a processor, or a computer readable medium, a logic gate, a switch, an application-specific integrated circuit (ASIC), a programmable logic controller, or a built-in microcontroller that stores computer readable program code (for example, software or firmware) that can be executed by the processor or the microprocessor. The processor can read and execute the program instruction or the module in the memory.

The transmission module can be configured to transmit data by using a network such as the Internet, an intranet, a local area network, or a mobile communications network.

It is worthwhile to note that the implementations in the present specification are described in a progressive way. For the same or similar parts in the implementations, references can be made to the implementations. Each implementation focuses on a difference from other implementations. In particular, the apparatus implementation and the electronic device implementation are basically similar to the method implementation, and therefore are briefly described. For related parts, references can be made to partial description of the method implementation. In addition, it can be understood that a person skilled in the art can think of any combination of some or all of the implementations enumerated in the present specification without creative efforts after reading the document of the present specification. These combinations also fall within the protection scope of the present specification.

In the 1990s, whether a technical improvement is a hardware improvement (for example, an improvement to circuit structures such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling needs to be written in a specific programming language, which is referred to as a hardware description language (HDL). There are many HDLs such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

It can be seen from the description of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium such as a ROM/RAM, a magnetic disk, or an optical disc, and includes several instructions for instructing a computer device (which can be a personal computer, a server, or a network device) to perform the methods described in the implementations or some parts of the implementations of the present specification.

The present specification can be applied to many general-purpose or special-purpose computer system environments or configurations, for example, a personal computer, a server computer, a handheld device or a portable device, a flat panel device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer-executable instructions, for example, a program module. The program module usually includes a routine, a program, an object, a component, a data structure, etc. for executing a specific task or implementing a specific abstract data type. The present specification can be alternatively practiced in distributed computing environments in which tasks are performed by remote processing devices that are connected by using a communications network. In the distributed computing environment, the program module can be located in both local and remote computer storage media including storage devices.

Although the present specification is described by using the implementations, a person of ordinary skill in the art knows that various modifications and variations can be made to the present specification without departing from the spirit of the present specification. It is expected that the appended claims include these modifications and variations without departing from the spirit of the present specification.

The invention claimed is:

1. A computer-implemented method for determining a new model parameter for a data processing model, comprising:

accessing, by a first data party, a first share of a first model parameter;

receiving, from a trusted party, a first share of a random orthogonal matrix;

determining a first share of a first product using sample data and a share of the first model parameter determining a first share of a value of an existing activation function using the existing activation function and the first share of the first product, wherein the existing activation function is used to construct the data processing model;

determining a first share of a gradient of an existing loss function using the existing loss function, the value of the existing activation function, and the sample data, wherein the existing loss function is used to measure a degree of inconsistency between a predicted value and an actual value of the data processing model, and wherein the sample data is used to train the data processing model;

determining a first share of a hessian matrix using the sample data and the first share of the gradient of the existing loss function, wherein the hessian matrix is a square matrix representing a local curvature of the existing loss function;

determining a first share of a second product using the first share of the random orthogonal matrix and the first share of the hessian matrix, wherein the second product is a matrix with a condition number;

when the condition number satisfies a predetermined condition, determining a first share of a first inverse matrix using the first share of the hessian matrix;

determining a first share of the new model parameter using the first share of the first model parameter, the first share of the first inverse matrix, and the first share of the gradient of the existing loss function;

receiving, from one or more other data parties, one or more other shares of the new model parameter, wherein the one or more other shares of the new model parameter can be combined with the first share of the new model parameter to produce the whole of the new model parameter; and using the whole of the new model parameter to train the data processing model, wherein two or more shares of the first model parameter, the random orthogonal matrix, the first product, the value of the existing activation function, the gradient of the existing loss function, the hessian matrix, the second product, the first inverse matrix, or the new model parameter can be combined to produce a whole of the first model parameter, the random orthogonal matrix, the first product, the value of the existing activation function, the gradient of the existing loss function, the hessian matrix, the second product, the first inverse matrix, or the new model parameter, respectively.

2. The computer-implemented method of claim 1, further comprising:

calculating the share of the new model parameter based on the share of the first model parameter, the first share of the gradient of the existing loss function, and a predetermined step size when the condition number of the second product does not satisfy the predetermined condition.

3. The computer-implemented method of claim 1, further comprising:

repeatedly performing steps comprising the computer-implemented method of claim 1 to receive, by the first data party, one or more other shares of a second new model parameter, wherein the second new model parameter is used by one or more data parties to train the data processing model.

4. The computer-implemented method of claim 1, wherein determining a first share of a value of an existing activation function comprises:

determining a value of a polynomial based on the first share of the first model parameter and the sample data wherein the polynomial is used to fit the existing activation function.

5. The computer-implemented method of claim 1, further comprising:

sending the first share of the second product to another data party, wherein the other data party calculates the condition number of the second product; and receiving the condition number of the second product, by the first data party.

6. The computer-implemented method of claim 1, wherein determining the first share of the first inverse matrix comprises:

receiving a share of the second product that is sent by another data party;

adding the share of the second product that is held by the first data party and the received share of the second product, to obtain the whole of the second product;

calculating an inverse matrix of the whole of the second product; and multiplying the inverse matrix by the first share of the random orthogonal matrix, to obtain the first share of the first inverse matrix.

7. The computer-implemented method of claim 1, further comprising:

determining a share of an additional product using the first share of the first inverse matrix and the first share of the gradient of the existing loss function; and subtracting the share of the additional product from the share of the first model parameter, to determining the first share of the new model parameter.

8. The computer-implemented method of claim 1, further comprising:

determining a share of an additional product using the first share of the gradient of the existing loss function and a predetermined step size; and subtracting the share of the additional product from the share of the first model parameter, to determining the first share of the new model parameter.

9. A non-transitory, computer-readable medium storing one or more instructions executable by a computer system to perform operations for determining a new model parameter for a data processing model, wherein the operations comprise:

accessing, by a first data party, a first share of a first model parameter;

receiving, from a trusted party, a first share of a random orthogonal matrix;

determining a first share of a first product using sample data and a share of the first model parameter determining a first share of a value of an existing activation function using the existing activation function and the first share of the first product, wherein the existing activation function is used to construct the data processing model;

determining a first share of a gradient of an existing loss function using the existing loss function, the value of the existing activation function, and the sample data, wherein the existing loss function is used to measure a degree of inconsistency between a predicted value and an actual value of the data processing model, and wherein the sample data is used to train the data processing model;

determining a first share of a hessian matrix using the sample data and the first share of the gradient of the existing loss function, wherein the hessian matrix is a square matrix representing a local curvature of the existing loss function;

determining a first share of a second product using the first share of the random orthogonal matrix and the first share of the hessian matrix, wherein the second product is a matrix with a condition number;

when the condition number satisfies a predetermined condition, determining a first share of a first inverse matrix using the first share of the hessian matrix;

determining a first share of the new model parameter using the first share of the first model parameter, the first share of the first inverse matrix, and the first share of the gradient of the existing loss function;

receiving, from one or more other data parties, one or more other shares of the new model parameter, wherein the one or more other shares of the new model parameter can be combined with the first share of the new model parameter to produce the whole of the new model parameter; and using the whole of the new model parameter to train the data processing model, wherein two or more shares of the first model parameter, the random orthogonal matrix, the first product, the value of the existing activation function, the gradient of the existing loss function, the hessian matrix, the second product, the first inverse matrix, or the new model parameter can be combined to produce a whole of the first model parameter, the random orthogonal matrix, the first product, the value of the existing activation function, the gradient of the existing loss function, the hessian matrix, the second product, the first inverse matrix, or the new model parameter, respectively.

10. The non-transitory, computer-readable medium of claim 9, further comprising:
calculating the share of the new model parameter based on the share of the first model parameter, the first share of the gradient of the existing loss function, and a predetermined step size when the condition number of the second product does not satisfy the predetermined condition.

11. The non-transitory, computer-readable medium of claim 9, further comprising:
repeatedly performing steps comprising the operations of claim 9 to receive, by the first data party, one or more other shares of a second new model parameter, wherein the second new model parameter is used by one or more data parties to train the data processing model.

12. The non-transitory, computer-readable medium of claim 9, wherein determining a first share of a value of an existing activation function comprises:
determining a value of a polynomial based on the first share of the first model parameter and the sample data wherein the polynomial is used to fit the existing activation function.

13. The non-transitory, computer-readable medium of claim 9, further comprising:

sending the first share of the second product to another data party, wherein the other data party calculates the condition number of the second product; and
receiving the condition number of the second product, by the first data party.

14. The non-transitory, computer-readable medium of claim 9, wherein determining the first share of the first inverse matrix comprises:
receiving a share of the second product that is sent by another data party;
adding the share of the second product that is held by the first data party and the received share of the second product, to obtain the whole of the second product;
calculating an inverse matrix of the whole of the second product; and
multiplying the inverse matrix by the first share of the random orthogonal matrix, to obtain the first share of the first inverse matrix.

15. The non-transitory, computer-readable medium of claim 9, further comprising:
determining a share of an additional product using the first share of the first inverse matrix and the first share of the gradient of the existing loss function; and
subtracting the share of the additional product from the share of the first model parameter, to determining the first share of the new model parameter.

16. The non-transitory, computer-readable medium of claim 9, further comprising:
determining a share of an additional product using the first share of the gradient of the existing loss function and a predetermined step size; and
subtracting the share of the additional product from the share of the first model parameter, to determining the first share of the new model parameter.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for determining a new model parameter for a data processing model, wherein the operations comprise:
accessing, by a first data party, a first share of a first model parameter;
receiving, from a trusted party, a first share of a random orthogonal matrix;
determining a first share of a first product using sample data and a share of the first model parameter
determining a first share of a value of an existing activation function using the existing activation function and the first share of the first product, wherein the existing activation function is used to construct the data processing model;
determining a first share of a gradient of an existing loss function using the existing loss function, the value of the existing activation function, and the sample data, wherein the existing loss function is used to measure a degree of inconsistency between a predicted value and an actual value of the data processing model, and wherein the sample data is used to train the data processing model;
determining a first share of a hessian matrix using the sample data and the first share of the gradient of the existing loss function, wherein the hessian matrix is a square matrix representing a local curvature of the existing loss function;

determining a first share of a second product using the first share of the random orthogonal matrix and the first share of the hessian matrix, wherein the second product is a matrix with a condition number;

when the condition number satisfies a predetermined condition, determining a first share of a first inverse matrix using the first share of the hessian matrix;

determining a first share of the new model parameter using the first share of the first model parameter, the first share of the first inverse matrix, and the first share of the gradient of the existing loss function;

receiving, from one or more other data parties, one or more other shares of the new model parameter, wherein the one or more other shares of the new model parameter can be combined with the first share of the new model parameter to produce the whole of the new model parameter; and using the whole of the new model parameter to train the data processing model, wherein two or more shares of the first model parameter, the random orthogonal matrix, the first product, the value of the existing activation function, the gradient of the existing loss function, the hessian matrix, the second product, the first inverse matrix, or the new model parameter can be combined to produce a whole of the first model parameter, the random orthogonal matrix, the first product, the value of the existing activation function, the gradient of the existing loss function, the hessian matrix, the second product, the first inverse matrix, or the new model parameter, respectively.

18. The computer-implemented system of claim 17, further comprising:

calculating the share of the new model parameter based on the share of the first model parameter, the first share of the gradient of the loss function, and a predetermined step size when the condition number of the second product does not satisfy the predetermined condition.

19. The computer-implemented system of claim 17, further comprising:

repeatedly performing steps comprising the operations of claim 17 to receive, by the first data party, one or more other shares of a second new model parameter, wherein the second new model parameter is used by one or more data parties to train the data processing model.

20. The computer-implemented system of claim 17, wherein determining a first share of a value of an existing activation function comprises:

determining a value of a polynomial based on the first share of the first model parameter and the sample data wherein the polynomial is used to fit the existing activation function.

* * * * *